UNITED STATES PATENT OFFICE.

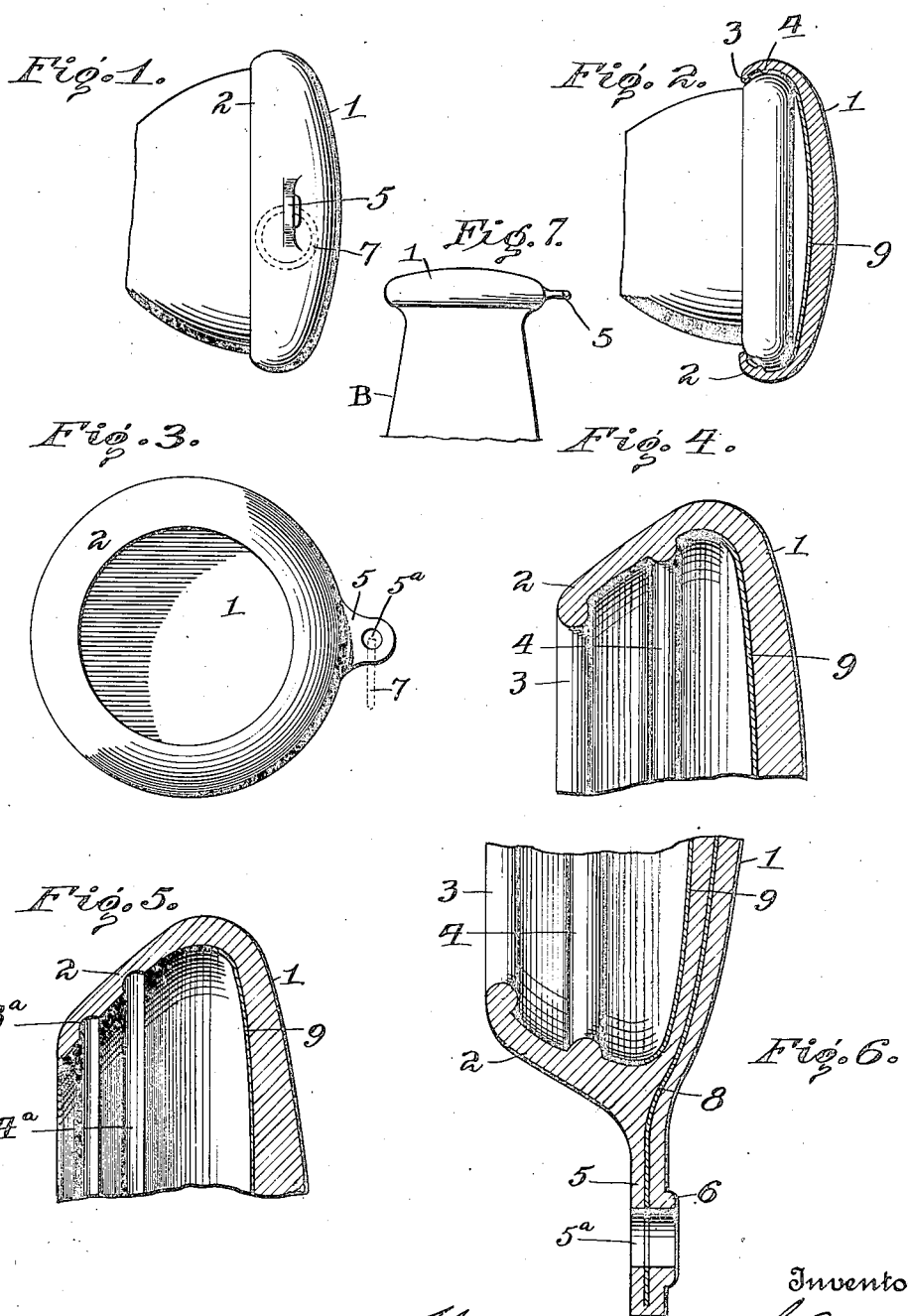

WILLIAM F. SCHACHT, OF HUNTINGTON, INDIANA.

PROTECTIVE CAP.

1,410,605.

Specification of Letters Patent. Patented Mar. 28, 1922.

Application filed December 1, 1919. Serial No. 341,691.

*To all whom it may concern:*

Be it known that I, WILLIAM F. SCHACHT, a citizen of the United States, residing at Huntington, in the county of Huntington and State of Indiana, have invented certain new and useful Improvements in Protective Caps; and I hereby declare that the following is a full, clear, and exact description thereof, reference being had to the accompanying drawings, which form part of this specification.

This invention is a novel protective cap adapted for various uses in the art, and which may be made of various sizes to suit the intended use. The cap is intended for use for closing bottles, or containers, for glue, ink, milk, etc. The cap can be readily applied and removed at will without injury to itself; and is particularly useful to protect the contents of bottles after they have been partially emptied.

The cap can also be readily adapted for use on automobile headlights to cover same when not in use and protect them from dust, weather, and injury by small flying objects, and for covering the gauge-registers of gasoline tanks to protect same from dust, water, dirt, etc., which otherwise might settle thereon.

The novel cap is made in one piece of rubber or like material and comprises a substantial concavo-convex body portion and an integral elastic inverted conical flange surrounding the body portion and adapted to be snapped over the outer edge of a headlight, gauge, bottle, and the like; the lower portion or mouth of the flange being of less diameter than the body portion and the end of the object which it is to engage to make it hold tightly on such object; and this flange is provided with means to ensure the cap holding securely thereon, and to prevent tearing of the flange and prolong its wear. The cap is also preferably provided with a lateral projection or ear at one side which is useful in attaching or detaching the cap from the object, and also for suspending the cap when not in use. The body of the cap may be reinforced and lined with canvas or other suitable material, to protect the contents of the bottle from direct contact with the rubber of the cap, when the latter is used on a bottle.

I will explain the invention in detail with reference to the accompanying drawings which illustrate some practical embodiments of the invention, and then summarize in the claims the essentials of the invention and novel features of construction for which I desire protection.

In said drawings:

Fig. 1 is a side view of the cap as applied to an ordinary automobile headlight.

Fig. 2 is a sectional view of such cap as applied to such a headlight.

Fig. 3 is a bottom view of the cap.

Fig. 4 is an enlarged detail sectional view on line 4—4, Fig. 3.

Fig. 5 is a similar detail sectional view indicating a reversed construction.

Fig. 6 is an enlarged sectional view on line 6—6, Fig. 3, showing the lining and reinforcing of the cap and ear.

Fig. 7 is a side view of a cap applied to a milk bottle.

The cap as shown is approximately circular in plan, and approximately oval in side elevation. Its body portion 1 is convex on its outer side and concave on its inner side. Surrounding the outer edge of this body portion and formed integral therewith is a flange portion 2 approximately resembling the frustum of an inverted cone, and concavo-convex in cross section. This flange portion is shaped to approximately conform to the usual exterior flange or bead surrounding the front of an ordinary automobile headlight, or the collar surrounding the mouth of an ordinary gauge register; or the mouth of the ordinary bottle or container or other object on which the cap is to be used. The mouth or opening of the flange is smaller in diameter than the body portion and smaller than the collar or end of the object to which the cap is to be applied, so that the flange mouth is stretched in applying the cap to an object, or removing it therefrom.

The edge or mouth of the flange 2 is preferably provided interiorly with spaced annular ribs 3, 4, preferably formed integral with the flange. These ribs strengthen and reinforce the flange and prevent its tearing when being stretched over the mouth of an object; and they also cause the mouth of the flange to tightly close around the neck of the object when the cap is applied thereto.

When the cap is applied to an object, the stretching of the flange over such object tends to produce a partial vacuum or suction between the portion of the flange bounded by the ribs 3 and 4 and the surface of the object, which suction causes the cap to securely hold its position on the object, and prevents it slipping off. Such suction might be produced by reversing the construction and forming annular channels 3ª and 4ª in the inner portion of the flange, as indicated in Fig. 5.

By reason of its shape the cap will tightly surround the end of the object and firmly adhere thereto when placed thereon. By reason of the externally convexed body portion as described, if the cap is applied to an object so that the cap is horizontal any foreign substances dropping upon the cap will roll off and over the edges of the cap instead of collecting and settling upon it.

The cap is preferably provided at one side of the flange 2 with a laterally projecting ear 5 formed integral therewith; which ear may be used as a means for readily disengaging the cap from the bottle B or other object and also as a means for suspending it from a nail or hook when not in use.

Preferably, as shown in the drawing, the inside of the body of the cap is lined with cloth, or other suitable material, indicated at 9. This lining not only strengthens and stiffens the body portion of the cap, but also when the cap is used on bottles will prevent the contents of the bottle from coming into direct contact with the rubber of the cap.

In the form shown the ear has an opening 5ª, surrounded by a raised annular portion 6 on the upper side of the ear, which portion 6 strengthens the ear around the opening. If desired, a ring 7 may be engaged with the opening 5ª, as indicated in dotted lines in Figs. 1 and 3. The ear 4 and body of the cap may also be reinforced if desired, by a lining of canvas, or other suitable textile material, indicated at 8, which is embedded in the material of the cap and ear during the molding thereof and vulcanized therein. Preferably the reinforcement 8 extends around the opening in the ear and may extend into or throughout the body portion 1 of the cap, as indicated in Fig. 6. Such reinforcement enhances the durability of the cap and ear and will prevent the opening in the ear tearing out when the stopple is hung on a nail or hook.

As stated the uses of the cap are various; and its size would depend upon its intended use; and special sizes of caps would be made to suit different objects. The caps can be slipped over the headlights of an automobile; to protect the glass from water when washing the machine; also to cover the headlights when driving in daytime to keep out dust, mud, water, etc. The general utility and applicability of the invention will be readily appreciated when the invention is known.

What I claim is:

1. A cap formed of rubber or like material having a body portion and an integral inverted conical flange, the flange being pliable and elastic and adapted to be engaged with and fit closely to the object to be covered, the mouth of the flange being smaller than the end of said object with which the cap is engaged, the said flange being provided internally with suction producing means; and a lining of fabric or suitable material on the inside of the cap, substantially as described.

2. A cap formed of rubber or like material having a body portion and an integral inverted conical flange, the flange being pliable and elastic and adapted to be engaged with and fit closely to the object to be covered, the mouth of the flange being smaller than the end of said object with which the cap is engaged, the said flange being provided internally with suction producing means; said cap having an exterior ear projecting therefrom adjacent the junction of the body and flange portions; and a lining within the cap, substantially as described.

3. A cap formed of rubber or like material having an externally convex body portion and an integral depending inverted conical flange, the flange being pliable and elastic and adapted to be engaged with and fit closely to the bead or collar surrounding the end of the object to which the cap is to be applied and the mouth of the flange being smaller than the said collar, so that when the flange is stretched over the collar it will closely adhere thereto; and a lining of fabric or suitable material on the inside of the cap to protect the contents of the bottle from contact with the rubber.

4. A cap formed of rubber or like material having an externally convex body portion and an integral depending inverted conical flange, the flange being pliable and elastic and adapted to be engaged with and fit closely to the bead or collar surrounding the end of the object to which the cap is to be applied and the mouth of the flange being smaller than the said collar, so that when the flange is stretched over the collar it will closely adhere thereto; said cap having an exterior ear projecting therefrom adjacent the junction of the body and within the cap, substantially as described.

5. A cap formed of rubber or like material having an externally convex body portion and an integral depending inverted conical, pliable and elastic flange adapted to be engaged with and fit closely to and over the bead or collar surrounding the end of the object to which the cap is to be applied, the mouth of the flange being smaller than the said bead, so that when the flange is stretched thereover the cap will closely adhere thereto; said flange being also provided internally with suction producing means so that the flange when applied to an object will closely adhere thereto.

In testimony that I claim the foregoing as my own, I affix my signature.

WILLIAM F. SCHACHT.